Patented Nov. 6, 1934

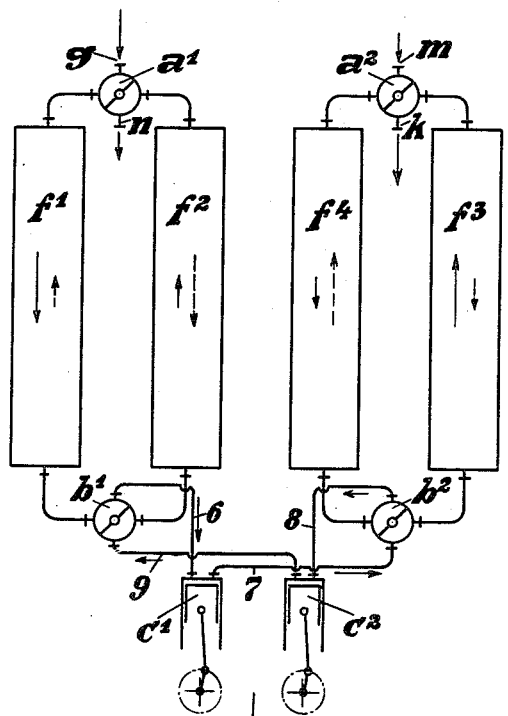
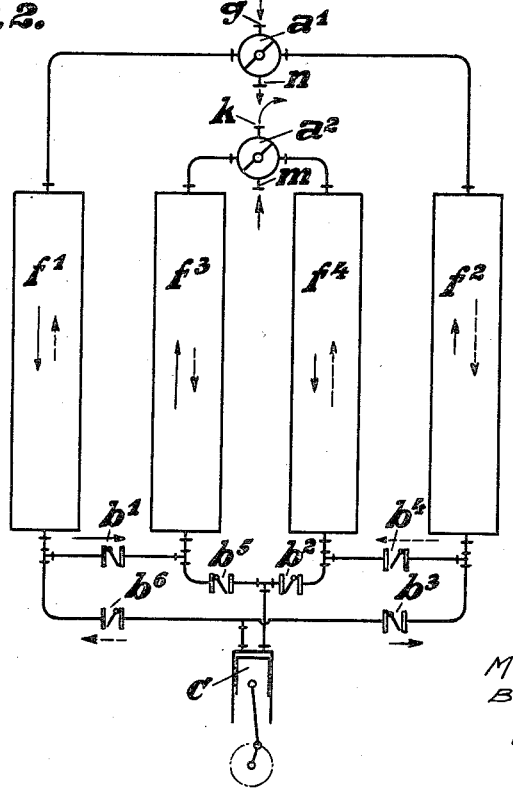

1,979,682

UNITED STATES PATENT OFFICE 1,979,682

PROCESS FOR SEPARATING VAPORS FROM GASEOUS MIXTURES

Mathias Fränkl, Augsburg, Germany, assignor to American Oxythermic Corporation, New York, N. Y., a corporation of Delaware Application August 1, 1930, Serial No. 472,445
In Germany August 19, 1929

9 Claims. (Cl. 62—175.5)

The invention relates to a process and apparatus for the separation of vapors from a gaseous mixture by subjecting the gaseous mixture to low temperature, whereby the vapors are deposited as a frozen mass and subsequently subliming the deposit by contacting therewith another gas. More particularly, it relates to the separation of carbon dioxide and water vapor from a gas capable of utilization in blast furnace operation, and includes correlated improvements and discoveries whereby the separation of carbon dioxide more particularly is effected.

The reduction of ore in a blast furnace effects the combination of not more than about 25% of the carbon monoxide (CO) generated by the burning of one kg. carbon with oxygen contained in the ore to form carbon dioxide (carbonic acid, $CO_2$). This produces a quantity of heat amounting to $0.5 \times 3000 = 1500$ Cal., which together with 2470 Cal. yielded by burning the carbon to CO amounts to a total of 3970 Cal. If the reduction of the ore does not take place in a blast furnace, but separately from the melting process by a special reduction process in order to produce sponge iron, the heat which the fuel yields is still less, and is about 2000 Cal. per kg. carbon.

Consequently about two-thirds of the calorific effect of the carbon or coke is lost in such a process because the carbon monoxide must be withdrawn from the furnace inasmuch as it is admixed with about 30% carbon dioxide and therefore is unsuitable for further use.

This deficiency may be remedied by reducing $CO_2$ in a regenerator, but since in the regeneration of one part $CO_2$ two parts CO are always produced, the amount of CO increases by an amount equal to the amount of $CO_2$ in the gas treated, so that in the end there is an equally large surplus of gas. In order to keep constant the amount of CO, one-half the $CO_2$ would have to be separated before the regeneration and only the other half reduced.

An object of the invention is to provide a process in which components or vapors are separated from a gaseous mixture as a deposit upon cold surfaces and such deposit subsequently sublimed by contacting with another gas.

Another object of the invention is to provide a process by means of which a surplus of carbon dioxide in a service gas may be separated therefrom by cooling to a low temperature, whereby carbon dioxide deposits as a frost and is subsequently sublimed by direct contact with air or another non-service gas, and together therewith withdrawn from the system.

An additional object of the invention is to provide a process which effects simultaneous removal of carbon dioxide and water vapor from a gaseous mixture by passing the mixture through a cold yielding zone wherein carbon dioxide and water deposit, expanding, and then passing through a cold absorbing zone. The carbon dioxide and water deposited being subsequently removed by sublimation by contact with an expanded cold gas.

It is also an object of the invention to provide an apparatus comprising in combination cold accumulators, expansion engines, conduits operatively connecting the same, and means for reversing the flow through the apparatus.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

In the practice of the invention, a gaseous mixture may be freed from vapors, such as carbon dioxide and water, by subjecting the gaseous mixture to a low temperature, as passing it through a cold yielding zone, for example a cold accumulator, whereby vapors are separated out by freezing and deposit upon the cold surfaces. The deposited vapors may subsequently be removed by contacting the deposit with a gas or gaseous mixture, as by passing such gas in direct contact with the deposits upon the cold surfaces.

More particularly, carbon dioxide may be freed from a service gas, that is, a gas suitable for utilization in blast furnace operation, by conducting the gas through a low temperature zone, as a cold accumulator cooled to a temperature at which the carbon dioxide will deposit as a frost. The gaseous mixture is thereafter expanded in a suitable expansion engine with performance of external work, while at the low temperature, and the cold content of the gas is then given up in a cold absorbing zone, namely a cold accumulator. The process is preferably carried out through the use of two pairs of cold accumulators; through one pair gaseous mixture with deposition of carbon dioxide is flowing, and at the same time through the other pair air or another non-service gas is passing with deposition of moisture in an ingoing accumulator. The air following expansion absorbs deposited carbon dioxide from the other or outgoing accumulator while giving up its cold thereto. The flow of gases through the accumulator pairs is reversed so that the gas traverses the path previously traversed by air, and the air follows the path previously taken by the gas but in reverse order, that is, the entry accumulators are now the exit accumulators.

At the same time that carbon dioxide is deposited, the water vapor contained in the gas and air will precipitate on the cold surfaces as moisture or frost, and will subsequently sublime into the gas or air and be so withdrawn. The sublimation effect can, however, take place only if the withdrawn gas or air has a larger volume than that of the introduced gas or air, inasmuch as the absorption of the deposited vapor is a function of the volume.

In order to ensure the sublimation, the gas as well as the air is compressed to about 0.5 atm. (all pressures will be understood to be above atmospheric) and the pressure released within the zone of low temperature as the air or gas passes from an entry cold accumulator to an exit cold accumulator. There is thus produced such a difference in volume between the introduced air or gas and the withdrawn air or gas as is necessary for the complete removal of the frost and moisture.

In cases where it is desired to utilize the gas in the compressed state, after it is freed of $CO_2$, as for instance in the operation of blast furnaces, the gas is compressed as required, viz. to about 0.5 atm. before being treated in the $CO_2$ separation apparatus. It, however, is not expanded so that it may be blown at that pressure into the blast furnace. On the other hand, the introduced air is compressed about 0.5 atm. higher than the gas, that is to about 1 atm. and, after cooling to low temperature, only the air is expanded to about 0.1 atm. in an expansion engine performing external work.

This performance in the cold air expansion engine (either piston engine or turbine) also produces a cold supply which serves to replace the cold unavoidably lost in the operation of these plants for separating $CO_2$.

The compression thus serves two ends; the difference in volume between the total amount of introduced and withdrawn gas, which is required for complete sublimation is attained, and the supplementary cold necessary for replacing the lost cold is gained by an expansion of the gas and air, or air only which has been compressed to a higher degree.

Fig. 1 of the accompanying drawing represents an example of an apparatus for carrying out the process.

Fig. 2 shows a modification of the inventive idea.

The apparatus (Fig. 1) comprises in combination four cold accumulators $f_1$ and $f_3$, $f_2$ and $f_4$, four cross-over or reversing valves $a_1$ and $a_2$, $b_1$ and $b_2$ and two expansion engines $c_1$ and $c_2$. Before operation is started all four cold accumulators are cooled to a temperature of about $-125°$ C. by any known means as by the cold resulting from the expansion of a gas.

The gas which is to be freed from $CO_2$ and which has been compressed to 0.5 atm. is introduced at a point $g$ through the valve $a_1$. It passes into the cold accumulator $f_1$, where, in the upper third thereof, it is cooled to $-30°$ C. and its moisture content is precipitated on the surfaces of the cold accumulator metallic-filling which are below $0°$ C. in the shape of frost which adheres thereto. As the gas within the cold accumulator proceeds lower, the carbonic acid also freezes out and adheres to the surfaces in the form of frost. The gas now freed of $CO_2$ and $H_2O$ streams through the valve $b_1$ and piping 6 into the expansion engine $c_1$ where its temperature is lowered by about $6°$ C. It is then conducted through the piping 7 and the valve $b_2$ into the cold accumulator $f_3$, there gives up its cold and, in the upper third, absorbs moisture by sublimation of the frost deposited on the surfaces. The liquid moisture, which previously was precipitated in the shape of dew, will also be absorbed and the gas will be finally withdrawn near the point $k$ through the valve $a_2$. This course of the gas is indicated in the drawing by long full line arrows. The cold accumulator $f_1$ now contains the moisture and $CO_2$ separated from the gas, while the cold accumulator $f_3$ is perfectly dry.

During the same period of time air compressed to 0.5 atm. is introduced near the point $m$ into the cold accumulator $f_4$ through the valve $a_2$, there deposits its moisture content and, lower down, its content of $CO_2$, and thence passes through the valve $b_2$ and piping 8 into the expansion engine $c_2$, where it is expanded to 0.1 atm. and thereby produces cold. It then streams through piping 9 and cross-over valve $b_1$ into the cold accumulator $f_2$ wherein it gives up its content of cold, absorbs, by subliming, the moisture and $CO_2$ deposited in the shape of frost and dew, and thus charged with $CO_2$ and $H_2O$ it leaves near point $n$ through the valve $a_1$. The way taken by the air during this period is indicated by short full line arrows.

Now all the cross-over valves are reversed and the gas at a pressure of 0.5 Atm. is introduced into the cold accumulator $f_2$ through the valve $a_1$, near point $g$, the accumulator $f_2$ being the same cold accumulator which just previously had been cleared of $CO_2$ frost and moisture by means of air. The gas in the upper portion of the cold accumulator deposits its moisture and, lower down, its $CO_2$ content, and then streams through the reversed valve $b_1$ and piping 6 into the expansion engine $c_1$, leaving it expanded and at a temperature lower by $6°$, through the valve $b_2$ and passes into the cold accumulator $f_4$. There it is reheated, absorbs deposited water in the upper part thereof and is withdrawn substantially freed of $CO_2$, but charged with moisture through the reversed valve $a_2$. The way taken by the gas during this second period is indicated by long dotted arrows.

At the same time, near point $m$ air is introduced into cold accumulator $f_3$ through the valve $a_2$. The air is cooled there to $-125°$ C. and in the upper portion of the cold accumulator deposits its moisture. It then streams through the valve $b_2$ and piping 8 into the expansion engine $c_2$ which it leaves, expanded and cooler by $6°$, through the piping 9 and the valve $b_1$, and passes into cold accumulator $f_1$. In the lower portion of this accumulator it absorbs, by sublimation, $CO_2$ frost and in the upper portion moisture, and gives up its cold content to the accumulator filling. Laden with $CO_2$ and $H_2O$ it thereupon is allowed to escape through the valve $a_1$. This valve as well as valves $a_2$, $b_2$ and $b_1$ are reversed during this period in the sense opposite to the one shown in the drawing.

Therefore, air is introduced and gas substantially free from carbon dioxide is withdrawn only through cold accumulators $f_3$ and $f_4$, whereas gas is introduced and air containing carbon dioxide and water is withdrawn only through cold accumulators $f_2$ and $f_1$.

Thus, that which is introduced into the cold accumulators, whether air or gas, always contains moisture. It is only the withdrawn air, however, that contains a considerable amount of $CO_2$, while the withdrawn gas is substantially free from $CO_2$. On the other hand, the entering gas contains up to one third $CO_2$, while entering air is almost free of $CO_2$. The $CO_2$ and the moisture contained in the gas are absorbed by air, while the gas absorbs the moisture and $CO_2$ content of the air. Further, the same pair of cold accumulators always operate conjointly, namely $f_1$ together with $f_3$, and $f_2$ together with $f_4$, in the illustrated or in the reversed order.

Both gas and air entering the cold accumulators are compressed, while they leave them (Fig. 1) in an expanded state. Thus the difference in volume indispensable for complete sublimation is obtained and the energy consumed in compression may be usefully employed in the output of cold for compensating the surface losses and other losses of cold which cannot be avoided in cold exchanging. Apart from that the process is thermically well balanced since both the cold expended for refrigeration and that for freezing out $H_2O$ and $CO_2$ are recovered, when the $CO_2$ and $H_2O$ are taken up by sublimation.

If gas has to be compressed anyway, as in the operation of blast furnaces, the novel process may be carried out with a single expansion engine, as shown in Fig. 2 of the drawing in which parts identical with those shown in Fig. 1 are designated by identical letters and figures; the only exception being that $b_1$, $b_2$, $b_3$ and so on, do not here designate cross-over valves as in Fig. 1, but check valves. Gas containing $CO_2$ and having a pressure of 0.5 atm. enters at $g$ through the valve $a_1$ at the top of the regenerative cold-accumulator $f_1$ and is cooled therein, the carbonic acid being frozen out. The gas is then lead out again through the cold accumulator $f_3$ and gives up its cold therein, leaving the apparatus at $k$.

Air compressed to 1 atm. is introduced through the valve $a_2$ into the regenerative cold-accumulator $f_4$ at the top, leaves this accumulator at the bottom, and then enters into the expansion engine $c$, where its pressure is reduced practically to atmospheric pressure. Then the gas is led out of the cold-accumulator $f_2$ after having given up its cold there, and leaves the apparatus at $n$.

After the switching-over has taken place, the gas containing $CO_2$ is led into the regenerative cold accumulator $f_2$ and is led out of the cold accumulator $f_4$, the air, however, is led into the cold accumulator $f_3$, loses its pressure in the expansion engine and is led out of the cold accumulator $f_1$, the carbonic acid having been previously frozen out of the gas. The frozen carbonic acid is gasified by air by means of sublimation and is absorbed by this air.

In the described example air has to be compressed to a higher degree than is necessary otherwise, that is to about 1 atm., and expanded to 0.1 atm. while the gas passes in an unexpanded state through the process for separating the $CO_2$. Compression of both the gas and the air takes place in this latter case. However, only the air need be expanded providing it is compressed to a pressure which is 0.5 of an atm. higher than the pressure of the gas.

Instead of air another gas may be utilized for absorbing the $CO_2$, and vapors other than $CO_2$ may be separated by the process.

The process may also be carried out with only a single pair of cold accumulators. In this case the gas and the air compressors operate alternately and for only half the time. Besides, as gas free from $CO_2$ is generally needed continuously, a gas holder has to be provided to supply such gas during the period of interrupted production.

A characteristic feature of the invention is that both the air, or other non-service gas, and the gas, especially a service gas, are compressed and then introduced into the cold accumulator which is, at the time, the first in the periodically reversed direction of flow (entry accumulator). Therein they are cooled and deposit their moisture and $CO_2$ content. Further, that on passing to the exit accumulator and while in the zone of low temperature, both the gas and the air, or only the air compressed to a higher degree than the gas, are expanded in an engine, in order to compensate by the work effected for losses of cold, and to produce a difference in volume necessary for complete sublimation. The gas and the air give up their cold content in the exit cold accumulator and absorb moisture. The expanded air also absorbs $CO_2$ previously deposited therein by the gas.

Since certain changes in carrying out the above process and in the constructions set forth which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process for separating vapors from a gaseous mixture, which comprises compressing the gaseous mixture, subjecting the compressed gaseous mixture to a low temperature by contacting with a regenerative body whereby vapors are frozen out and deposited upon the surface of said body, then expanding while at a low temperature and passing through a cold absorbing zone, and compressing another gaseous body, subjecting said gaseous body to a low temperature by contacting with a regenerative body, expanding and subliming the deposit from the first gaseous mixture by contacting the expanded second gaseous body directly therewith.

2. A process for separating carbon dioxide and other vapors from a service gas, which comprises compressing said gas and conducting it through a cold yielding accumulator wherein carbon dioxide and other vapors are deposited as a frost, expanding the gaseous mixture while at a low temperature and conducting the expanded gas through a cold absorbing accumulator, and compressing a non-service gas, cooling in an accumulator wherein moisture is deposited, expanding while at a low temperature and passing it through a cold absorbing accumulator in which carbon dioxide and other vapors have previously been deposited whereby this expanded gas absorbs the deposit by sublimation, and periodically reversing the flow of the gases so that the service gas follows the path previously taken by the non-service gas and the non-service gas follows the course previously taken by the service gas but in opposite direction.

3. A process for separating gaseous constituents from a gaseous mixture, which comprises cooling said gaseous mixture to a low temperature by passing the same through a cold yielding zone whereby such gaseous constituents are deposited therein, compressing another and different gas, cooling such compressed gas to a low temperature by passing through a cold yielding zone, expanding the cooled and compressed gas, and subliming constituents deposited from said first mentioned gaseous mixture by passing the cooled and expanded gas in direct contact therewith.

4. A process for separating gaseous constituents from a gaseous mixture, which comprises cooling said gaseous mixture to a low temperature by contacting with a cold regenerative body whereby gaseous constituents are deposited upon the surfaces of said body, compressing another and different gas, cooling such compressed gas to a low temperature by contacting with another cold regenerative body, expanding the compressed and cooled gas, and subliming constituents deposited from said first mentioned gaseous mixture by passing the expanded gas in direct contact therewith.

5. An apparatus for separating vapors from gases, which comprises a plurality of cold accumulators arranged in pairs, valved conduits positioned at the cold and at the warm ends of the accumulators, the valved conduits at the warm end having an inlet and an outlet and also being connected with each accumulator by passages whereby gas is led to and conducted away from each accumulator through the valves, an expansion engine connected with the valves at the cold end of the accumulators by means of passages whereby a gas is led to and conducted away from said expansion engine, the valves also communicating with the accumulators by passages whereby gas is conducted to and from the accumulators, the passages, valves, and expansion engine being so arranged that a gas flowing from one accumulator to another passes through a valve, an expansion engine and then another valve.

6. An apparatus for separating vapors from gases, which comprises in combination a plurality of cold accumulators arranged in pairs, means for reversing the flow of gases through the accumulators positioned at the warm ends thereof, said reversing means being provided with inlet and outlet connections and also connected with each accumulator by means of conduits whereby gas is led to and conducted away from each accumulator through the reversing means, an expansion engine in communication with the cold ends of the accumulators by means of valved conduits whereby a gas is led to and conducted away from the expansion engine, the valved conduits also communicating with the accumulators for passage of gas to and from the accumulators, the conduits, valves and expansion engine being so arranged that a gas flowing from one accumulator to another passes through a valve, an expansion engine and then another valve.

7. An apparatus for separating vapors from gases, which comprises in combination four cold accumulators arranged in pairs, reversing valves positioned at the cold and at the warm ends of each pair, the reversing valves at the warm end being provided with inlet and outlet connections and also connected with each accumulator by means of conduits whereby gas is led to and conducted away from each accumulator through the reversing valves, two expansion engines connected with the cold end reversing valves by means of conduits whereby a gas is led to and conducted away from the expansion engines, the reversing valves also having conduits communicating with the accumulators for passage of gas to and from the accumulators, the conduits, reversing valves and expansion engines being so arranged that a gas flowing from one accumulator to another passes through a reversing valve, an expansion engine and then another reversing valve.

8. A process for separating carbon dioxide and water vapors from a service gas, which comprises compressing said service gas, cooling such gas to a low temperature by contacting with a cold regenerative body whereby carbon dioxide and water vapors deposit upon the surface of said body, separately compressing a non-service gas, cooling such non-service gas to a low temperature by contacting with a cold regenerative body upon which vapors are deposited, separately expanding said service and non-service gases, conducting said expanded non-service gas in contact with the regenerative body with which the service gas previously contacted whereby cold losses are recovered and the water vapors and carbon dioxide previously deposited from the service gas are removed by sublimation due to difference in volume created by expansion of the non-service gas, and conducting the expanded service gas in contact with the regenerative body with which the non-service gas previously contacted whereby cold losses are recovered and vapors deposited upon such regenerative body from the non-service gas are removed by sublimation due to difference in volume created by expansion of said service gas.

9. A process for separating carbon dioxide and water vapors from a service gas, which comprises compressing said service gas, cooling said compressed gas to a low temperature by contacting with a regenerative body whereby carbon dioxide and water deposit on the surface of said body, compressing a non-service gas to a pressure higher than that to which the service gas was compressed, cooling said compressed non-service gas to a low temperature by contacting with a regenerative body upon which vapors are deposited, expanding the compressed and cooled non-service gas, conducting the expanded non-service gas in contact with the regenerative body with which the service gas previously contacted whereby cold losses are recovered and carbon dioxide and water vapor deposited thereupon from said service gas are removed by sublimation due to difference in volume created by expansion of said non-service gas, and conducting the unexpanded service gas in contact with the regenerative body with which the non-service gas previously contacted whereby cold losses are recovered and vapors deposited thereupon from the non-service gas are removed by sublimation due to difference in volume between the outgoing service gas and ingoing non-service gas.

MATHIAS FRÄNKL.